United States Patent
Macela et al.

(10) Patent No.: US 11,086,000 B2
(45) Date of Patent: Aug. 10, 2021

(54) METHOD FOR TRACKING TRAJECTORY OF AN OBJECT WITH TIME OF FLIGHT SENSOR AND RELATED DEVICE

(71) Applicants: STMicroelectronics S.A., Montrouge (FR); STMicroelectronics (Research & Development) Limited, Buckinghamshire (GB)

(72) Inventors: Victor Macela, Paris (FR); Ed Hawkins, Edinburgh (GB); Olivier Pothier, Sceaux (FR); Manu Alibay, Vincennes (FR)

(73) Assignees: STMICROELECTRONICS (RESEARCH & DEVELOPMENT) LIMITED, Buckinghamshire (GB); STMICROELECTRONICS S.A., Montrouge (FR)

( * ) Notice: Subject to any disclaimer, the term of this patent is extended or adjusted under 35 U.S.C. 154(b) by 607 days.

(21) Appl. No.: 16/000,512

(22) Filed: Jun. 5, 2018

(65) Prior Publication Data
US 2018/0364339 A1 Dec. 20, 2018

(30) Foreign Application Priority Data
Jun. 16, 2017 (FR) .................................... 1755454

(51) Int. Cl.
*G01S 7/48* (2006.01)
*G01S 7/4865* (2020.01)
(Continued)

(52) U.S. Cl.
CPC .......... *G01S 7/4866* (2013.01); *G01S 7/4808* (2013.01); *G01S 17/04* (2020.01); *G01S 17/58* (2013.01);
(Continued)

(58) Field of Classification Search
CPC ...... G06F 3/0416; G06F 3/0421; G06F 3/017; G06F 3/0325
See application file for complete search history.

(56) References Cited

U.S. PATENT DOCUMENTS

2012/0280904 A1* 11/2012 Skurnik ................ G06F 3/0416
345/156
2013/0088422 A1* 4/2013 Niikura .................. G06F 3/017
345/156
(Continued)

OTHER PUBLICATIONS

STlife.augmented, "Optical Sensing: 1D to 3D using Time-of-Flight Technology," Shaping the Future of MEMS & Sensors, Sep. 10, 2013, 34 pages.

*Primary Examiner* — Luke D Ratcliffe
(74) *Attorney, Agent, or Firm* — Slater Matsil, LLP

(57) ABSTRACT

A method for acquiring tracking points belonging to a trajectory of a target object in motion, includes: emitting a radiation towards the target object; receiving a reflection of the radiation from the target object in respective fields of view of each detection zone of a network of detection zones; processing the reflection by determining distances separating the target object from an origin point by measuring a time of flight of the radiation in each detection zone; determining a degree of coverage of each detection zone; and estimating, based on the distances and on the degree of coverage of each detection zone, a position of a tracking point corresponding to a position of an extremity of the target object inside a respective detection zone chosen in a direction of motion of the target object.

25 Claims, 7 Drawing Sheets

(51) Int. Cl.
*G01S 17/66* (2006.01)
*G06F 3/01* (2006.01)
*G01S 17/88* (2006.01)
*G01S 17/58* (2006.01)
*G01S 17/04* (2020.01)
*G01S 17/894* (2020.01)

(52) U.S. Cl.
CPC .............. *G01S 17/66* (2013.01); *G01S 17/88* (2013.01); *G06F 3/017* (2013.01); *G01S 17/894* (2020.01)

(56) References Cited

U.S. PATENT DOCUMENTS

| | | | |
|---|---|---|---|
| 2013/0342671 A1* | 12/2013 | Hummel | G06F 3/011 348/77 |
| 2015/0144767 A1 | 5/2015 | Drader et al. | |
| 2015/0145768 A1 | 5/2015 | Drader et al. | |

\* cited by examiner

METHOD FOR TRACKING TRAJECTORY OF AN OBJECT WITH TIME OF FLIGHT SENSOR AND RELATED DEVICE

CROSS-REFERENCE TO RELATED APPLICATIONS

This application claims priority to French Application No. 1755454, filed on Jun. 16, 2017, which application is hereby incorporated herein by reference.

TECHNICAL FIELD

This disclosure relates generally to time of flight sensing, and in particular embodiments to a method for tracking a trajectory of an object with a time of flight sensor and a related device.

BACKGROUND

Systems for recognizing gestures allow users to interact with their electronic apparatuses in an intuitive and contactless manner, by a gesture of the hand.

For example, a hand gesture, such as a swipe, can instruct the apparatus to turn a page of a digital book.

Moreover, numerous applications are arising in the automotive industry, gesture recognition systems allowing a driver to control the onboard computer of their vehicle without diverting their attention.

FIG. 1 represents a time of flight sensor TOF, generally used in gesture recognition systems.

The time of flight sensor TOF measures a distance D separating it from an object H (a hand, in this representation) by measuring a time span Δt elapsed between an emission of a signal LASi of the electromagnetic wave type, such as a laser signal, and the reception of this signal LASr after reflection on the object H present in the field of view of the sensor TOF.

An emission part EM of the time of flight sensor TOF makes it possible to emit the incident signal LASi, and a reception part RC of the time of flight sensor TOF makes it possible to detect the reflected signal LASr.

More precisely, the distance D is the distance between the object H and an origin point O coinciding with the optical centre of the optical system with which the reception part RC of the sensor TOF is equipped.

FIG. 2A represents a reception plane PDT of the reception part RC of a time of flight sensor TOF, and three positions H1, H2, H3 of an object, projected into the detection plane PDT.

The detection plane PDT includes detection zones Zi, here arranged in matrix fashion according to a network of 4×4 zones. Each detection zone Zi receives the signal reflected by a part of the object occupying its field of view, represented here by the three projections H1, H2, H3 of the object.

For each detection zone Zi, with here $0 \leq i \leq 15$, a calculation of a degree of coverage Ci is carried out, as well as a calculation of the distance Di by time of flight measurement.

The degree of coverage Ci is representative of the proportion occupied by the object H in the field of view of a detection zone Zi.

Thus, each detection zone Zi is assigned a coverage-distance pair (Ci; Di) making it possible to estimate a barycentric position G1, G2, G3 of the object H1, H2, H3, for example by means of equation 1.

$$\vec{OG} = \frac{\sum_{i=0}^{N-1} c_i d_i \vec{n_i}}{\sum_{i=0}^{N-1} c_i} \quad \text{(Equation 1)}$$

With O the optical center of the reception part RC of the sensor, G the estimated barycentric position, N the number of detection zones, (ci, di) the coverage-distance pair for the zone Zi, and $\vec{n_i}$ the unit direction vector from the origin O to the center of the zone Zi.

This can make it possible to tag the successive positions H1, H2, H3, defining a trajectory of the object H in motion MVT.

Information relating to customary schemes for determining degrees of coverage and for determining barycentric positions are moreover described in the documents US 2015/0144767 A1 and US 2015/0145768 A1.

However, the dynamic range of the estimation of the barycenter is limited in a direction when the motion of the object along this direction is such that the coverage in each zone reaches a stable value. The consequence of this is to prevent the estimation of the barycentric position further on in this direction, and leaving it out in particular from the boundaries of the detection plane PDT.

This generally occurs for an object extending "indefinitely" along the direction in which it is moving.

For example, as represented by FIGS. 2A and 2B, this occurs for a hand which moves along the direction Y, the fingers parallel to this direction, when the wrist or the forearm penetrate into the detection plane PDT and when the tips of the fingers reach the opposite edge of the detection plane PDT (position H2).

If the hand continues its motion (position H3), the degrees of coverage remain almost unchanged with respect to their values at the position H2, thereby giving rise to a barycentric position G3 and following ones remaining in proximity to the barycentric position G2.

For example, with as reference CiHk the degree of coverage of the zone Zi ($0 \leq i \leq 15$) for the position Hk ($1 \leq k \leq 3$) of the object, it is clearly apparent in the example of FIG. 2A that C6H2≈C6H3 or C13H2≈C13H3.

The output dynamic range obtained in Y is then limited to substantially the detection half-plane PDT. The output dynamic range corresponds to the "useful area" in which a trajectory can be tracked.

FIG. 2B illustrates the output dynamic range DYN in the detection plane PDT of the measurement MES thus carried out. The hatched area corresponds to the detection plane area that is lost for an object extending along the direction X or Y in which it is moving, within the framework of a trajectory tracking by tagging of barycentric positions.

A solution to this problem consists in applying affine transforms (multiplication by a factor and addition of a shift) to the estimation of the coordinates X and Y of a barycentric position. This makes it possible to compensate the loss of dynamic range in a given direction, chosen as a function of the envisaged use of the time of flight sensor TOF, for example applying factors 2 and 1 respectively to the coordinates Y and X corresponds to a natural gesture of the hand, the arm raised vertically.

This solution nonetheless presents several drawbacks, as discussed in the following paragraphs.

The systematic application of the affine transformations may be inappropriate, for example when there is no "a priori" knowledge of the extent of the object along the direction of its motion. This corresponds to a raw loss of dynamic range.

Moreover, the control of a user as regards the motion is less precise, indeed, one and the same displacement in a direction X or in another direction Y is manifested by a greater motion in one of the directions. This corresponds to a loss of sensitivity.

Furthermore, the application of various affine transforms to the coordinates X and Y may introduce distortions in the motions carried out in the two coordinates. For example a diagonal motion will result in an acquisition of an oblique trajectory having a different angle, a more complex curved motion will result in an acquisition of a trajectory that is very unrepresentative of this motion. This corresponds to a loss of precision.

Consequently it is desirable to improve the utilization of the data measured by a time of flight sensor within the framework of the acquisition of successive tracking points representative of the trajectory of a target object, in particular in respect of dynamic range of output, of sensitivity, and of precision of the acquisition.

SUMMARY

According to one aspect a method for acquiring tracking points belonging to a trajectory of a target object in motion including: an emission of a radiation, for example an electromagnetic radiation such as a laser radius, towards the target object, a reflection of the radiation on the target object and a reception of this radiation reflected by the target object, in respective fields of view of each detection zone of a network of detection zones. The method also includes a processing including a determination of distances separating the target object from an origin point by measuring the time of flight of the said radiation in each detection zone; a calculation of a degree of coverage of each detection zone; and an estimation, on the basis of the said distances and of the said degrees of coverage, of the position of a tracking point corresponding to a position of an extremity of the target object inside a detection zone chosen in the direction of the motion of the target object.

According to another aspect there is proposed a device for acquiring tracking points belonging to a trajectory of a target object in motion, including: an emitter configured to emit a radiation, for example an electromagnetic radiation such as a laser radius, towards the target object and a receiver, including a network of detection zones, configured to receive this radiation reflected by the target object in the respective fields of view of each detection zone. The device further includes a processor configured to: determine distances separating the target object from an origin point by measuring the time of flight of the said radiation in each detection zone; calculate a degree of coverage of each detection zone; and estimate, on the basis of the said distances and of the said degrees of coverage, the position of a tracking point corresponding to a position of an extremity of the target object inside a detection zone chosen in the direction of the motion of the target object.

There is also proposed an electronic apparatus, such as a portable telephone or an embedded computer on board a vehicle, including a device such as defined hereinabove.

BRIEF DESCRIPTION OF THE DRAWINGS

Other advantages and characteristics of the invention will become apparent on examining the detailed description of wholly non-limiting embodiments and modes of implementation, and the appended drawings in which.

DETAILED DESCRIPTION OF ILLUSTRATIVE EMBODIMENTS

Figure 1:
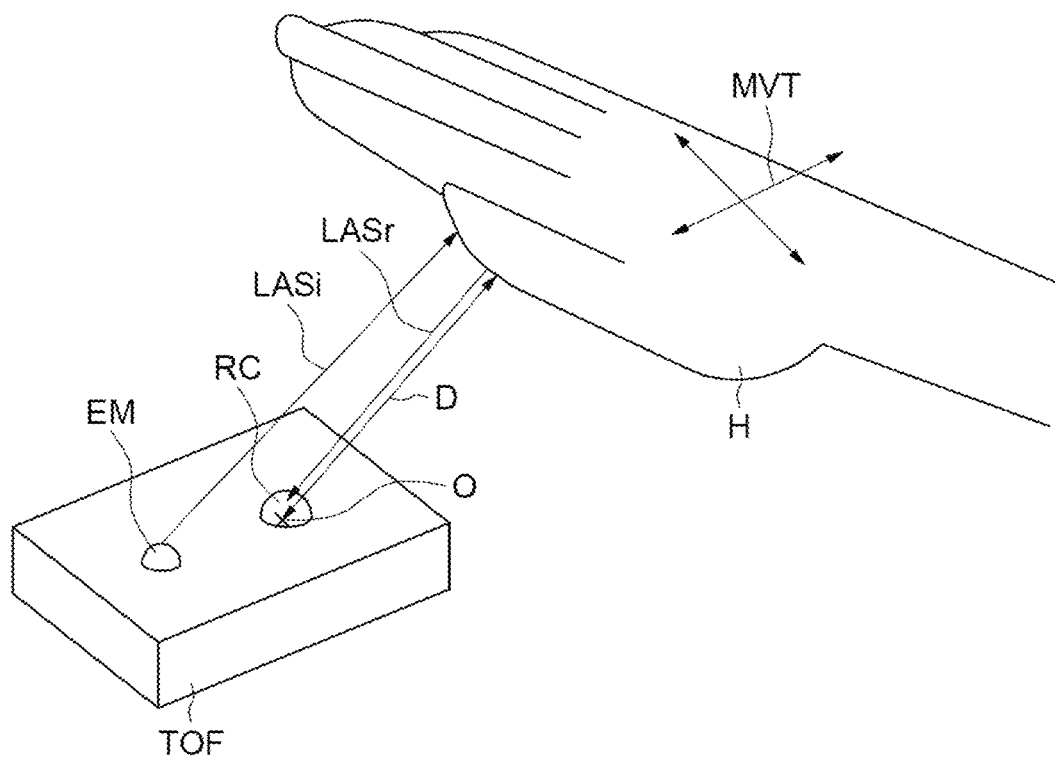
FIGS. 1, 2A and 2B represent customary implementations and embodiments of a time of flight sensor used for a tracking of a trajectory.
Figure 2B:
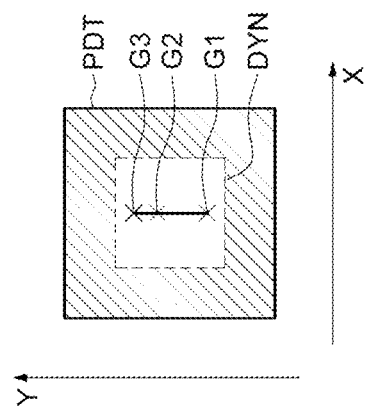
Figure 2A:
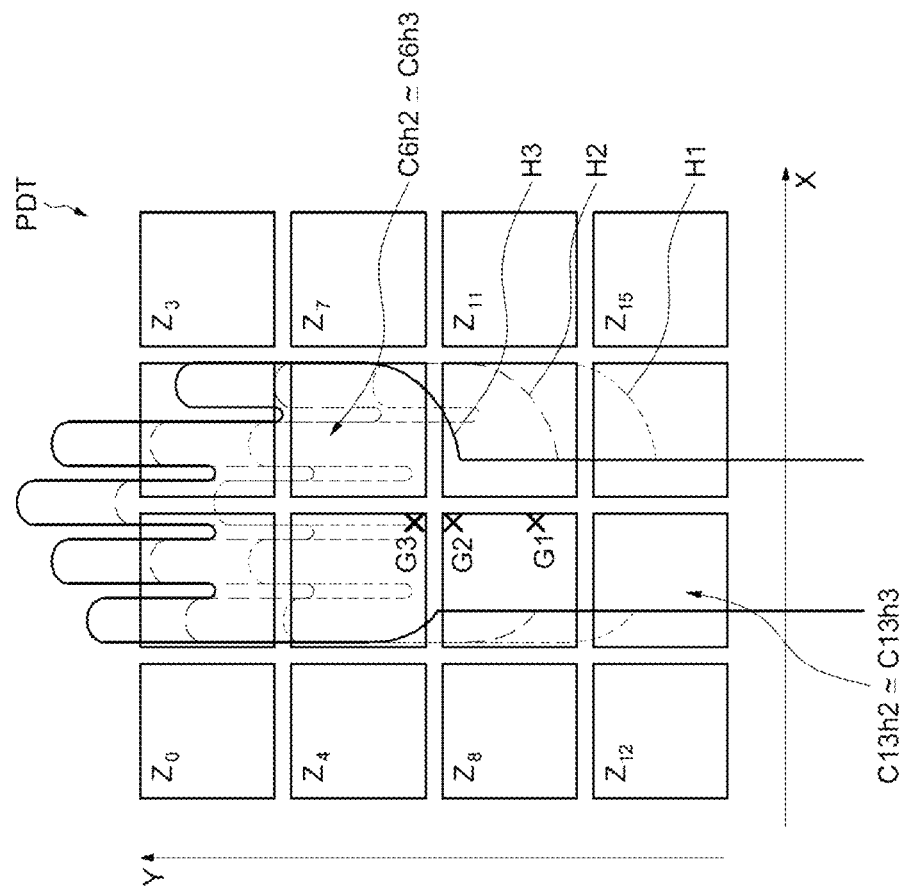
Figure 3:
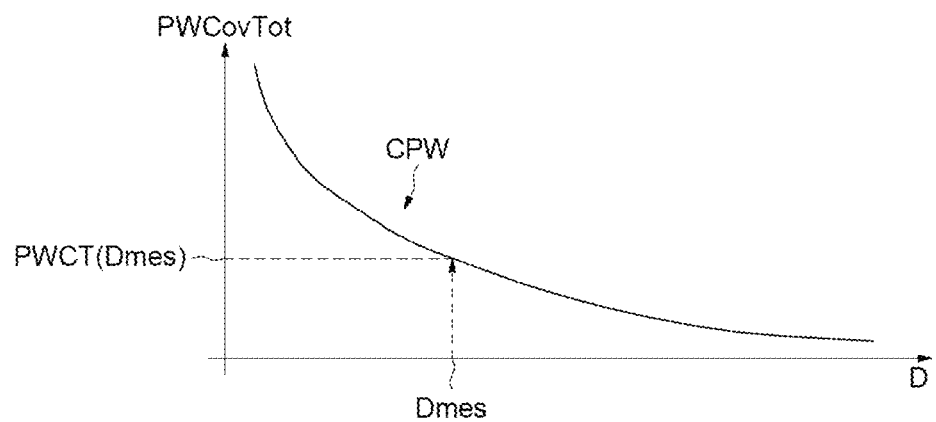
FIGS. 3 to 9 illustrate examples of modes of implementation and embodiments of the invention.

FIG. 3 represents a curve of the signal (PWCovTot) received by a time of flight sensor, of the type of that described in conjunction with FIGS. 1 and 2A, in a case where the object reflecting the emitted radiation occupies the whole of the field of view of a detection zone $Z_i$, as a function of the distance D separating the object from the origin point of this sensor.

This curve CPW is for example obtained by means of a laboratory measurement bench and can be modelled mathematically by a function proportional to substantially $1/D^2$.

Indeed, to calculate the degree of coverage of a detection zone $Z_i$ of such a time of flight sensor, the ratio of the quantity of reflected radiation LASr received in a detection zone $Z_i$ to a fixed maximum quantity is calculated.

The maximum quantity PWCT (Dmes) is read off the curve CPW, or calculated by a mathematical model, on the basis of the measured distance (Dmes) in this detection zone $Z_i$.

Figure 4:
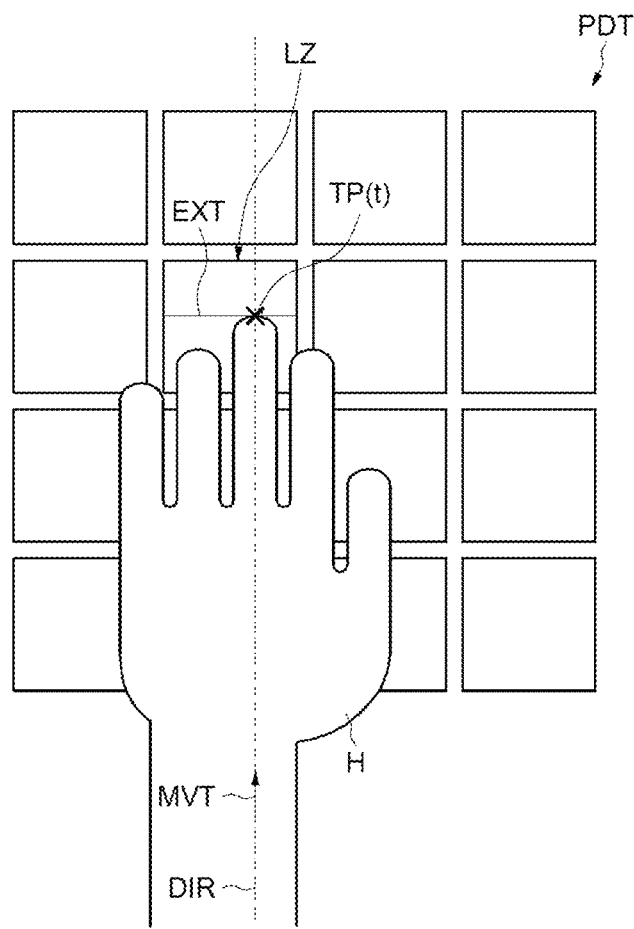

FIG. 4 represents a reception plane PDT of a reception part RC of a time of flight sensor TOF of the type of that described in conjunction with FIGS. 1 and 2A, and a representation of a position of a target object H, projected into the detection plane PDT.

A degree of coverage-distance pair is calculated for each detection zone.

According to a general mode of implementation, the position of a tracking point TP(t) corresponding to a position of an extremity EXT of a target object H in the direction DIR of the motion MVT of the target object H, and inside a last detection zone LZ, is estimated.

Thereafter, a new director line DIR is constructed by starting from this tracking point TP(t) and following the direction of a motion vector MVT, the last detection zone LZ is identified, inside which the position of a new tracking point TP(t+1) is estimated on an extremity EXT of the target object.

This makes it possible to utilize the entire dynamic range of the sensor, to not use any affine transformation, and to precisely specify the estimation of the positions of the tracking points.

The last detection zone LZ is for example identified as being the last detection zone having a non-zero degree of coverage $C_i$ along the direction DIR of the motion MVT of the target object.

Consequently this approach depends solely on the direction DIR of the motion vector MVT, and does not depend on its norm. Thus the motion vector can be obtained on the basis of the difference of two successive barycentric positions, whose direction is a reliable and precise representation of the direction of the said motion MVT.

The estimation of the position of the extremity EXT of the target object includes for example a construction of a plane angular sector in the field of view of the last detection zone LZ, or a construction of a segment generating a polygon with certain sides of the last detection zone. To estimate the position of the said extremity, the constructions are for example carried out by iterations until the ratio of this angular sector to a total angle, or the ratio of the solid angle of the said polygon to a total solid angle, approaches as closely as possible the measured degree of coverage.

To summarize, the said extremity is the position of the edge orthogonal to the director line DIR of the motion, and whose position inside the last detection zone corresponds to a geometric coverage of the zone.

Modes of implementation will be more fully detailed and illustrated hereinafter, notably in conjunction with FIGS. 5 to 7.

Stated otherwise, the proposed approach is distinguished from a combining of degrees of coverage to determine a global barycentric position, notably in that inter-zone correlations between zones of detection of the degrees of coverage are utilized.

The approach nonetheless pertains to an assumption according to which the shape of the object is static or hardly deformable, that is to say that it changes hardly, if at all, over time, which is generally satisfied in practice.

The degree of coverage, based on a detected quantity of signal (see hereinabove in conjunction with FIG. 3), is translated explicitly into a geometric coverage in an arbitrary horizontal plane (Z="constant"), for calculational purposes. For example the arbitrary horizontal plane may be the horizontal plane to which the previous tracking point belongs, calculated on the basis of the position of this tracking point within a detection zone and of the measured distance Di.

Figure 5:
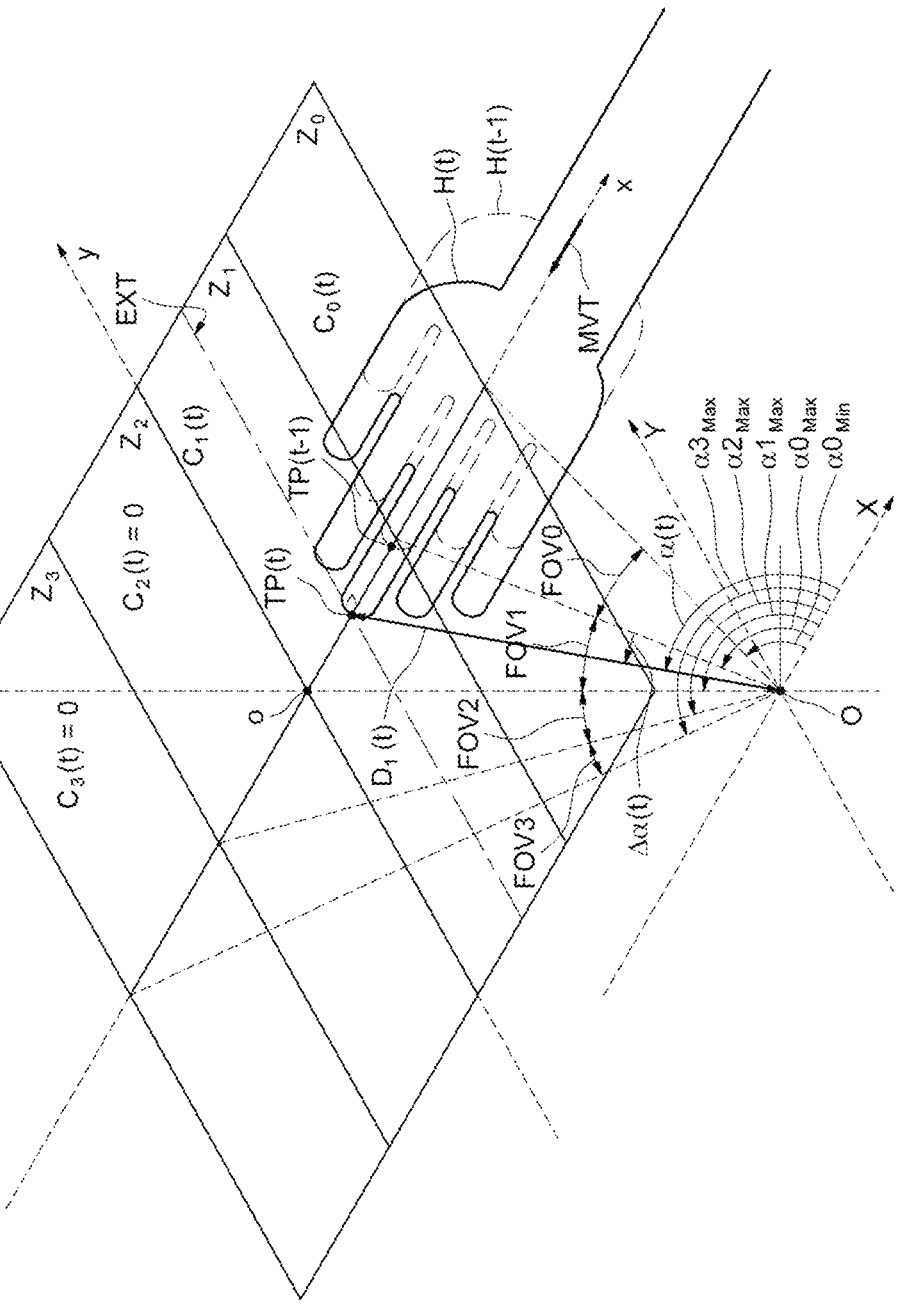

FIG. 5 represents an advantageous mode of implementation of monodirectional tracking of an edge of the target object, exhibiting the advantage of being simple in respect of quantity of calculation and applies without defect to a use in which the direction of the motion of the target object is known and unique.

The field of view of the sensor is divided in this example into 4 rectangular zones Zi ($0 \leq i \leq 3$) which are contiguous along the direction X and orthogonal to this direction (in the length-wise sense of the rectangles).

For each zone Zi, $\alpha$iMin (respectively $\alpha$iMax) is the angle between the axis X and the line joining the origin point O, to one or the other of the edges perpendicular to the axis X of the zone Zi in the plane (OX, OZ).

The origin point O defines the origin of the system (OX, OY, OZ) and is for example the optical centre of the reception part of the time of flight sensor TOF.

The edges of the zone Zi are the positions of the zone having the largest (respectively the smallest) coordinate X in an arbitrary horizontal plane.

The plane field of view FOVi of a zone Zi in the plane (OX, OZ), is therefore equal to $\alpha$iMax−$\alpha$iMin.

The sense of the motion MVT along the axis X is determined (towards positive X or towards negative X) and the last detection zone is identified, for example the one most distant having a non-zero degree of coverage along the direction of the motion MVT.

A simple way of determining the sense of the direction of the motion is to determine the first zone covered by the target object, and if this zone is situated in the half-plane of the positive X values, the object moves towards the negative X values, and vice versa.

The degree of coverage based on the signal Ci(t) of a zone Zi at the instant t is related to the ratio $\Delta\alpha i(t)$/FOVi, with $\Delta\alpha i(t)$ the angular sector in the plane field of view FOVi intercepted by the object at the instant t.

If the field of view in the three-dimensional space of the zone Zi can be entirely covered by the target object H(t) at a given height Z, then the degree of coverage Ci(t) is considered to be directly equal to that proportion of the plane field of view intercepted by the object at the instant t: $Ci(t)=\Delta\alpha i(t)/FOVi$ (equation 2a).

Otherwise, in the general case, the degree of coverage Ci(t) is multiplied by a proportion factor S(t) and the result gives the proportion of the plane field of view FOVi that is intercepted by the object at the instant t: $Ci(t)S(t)=\Delta\alpha i(t)/FOVi$ (equation 2b), with $S(t)=(1/Cadj(i)(t-1))*(FOVadj(i)/FOVi)$, where Cadj(i)(t−1) is the degree of coverage of the zone Zadj(i) at the instant t−1, adj(i) being the index (i−1 or i+1 here) of the zone adjacent to the zone Zi in the sense of the motion MVT.

Two assumptions, generally satisfied, are made here. Firstly, it is assumed that Cadj(i)(t−1) is the degree of coverage based on the signal for which the plane field of view FOVadj(i) of the zone Zadj(i) in the plane (OX, OZ) is entirely covered by a part of the object or the entire object at a given height Z, at the instant t−1. That is to say that the intersection, at a given height Z, between the zone Zadj(i) and the plane (OX, OZ), i.e. the straight segment between the edges of the zone Zadj(i) in the plane (OX, OZ), is completely covered by a part of the object or the entire object at the instant t−1. It is also assumed that the target object H(t) has moved without deforming or while hardly deforming between the instants t−1 and t, that is to say that the part of the object generating the degree of coverage Ci(t) at the instant t was present, without having changed or having hardly changed, in the zone Zadj(i) at the instant t−1.

The angle $\alpha(t)$ in the plane (OX, OZ) makes it possible to site a straight line EXT representative of an extremity of the target object H(t), perpendicular to the direction of its motion MVT, at the instant t.

The angle $\alpha(t)$ is obtained on the basis of the angular sector $\Delta\alpha(t)$, in the last detection zone, that is to say the most distant detection zone in the direction of the motion MVT that has a non-zero degree of coverage.

Let Zk(t) be the said last detection zone (in the representation of FIG. 5, k=1), then, for a motion MVT in the sense in which X varies positively, $$\alpha(t)=\alpha k\text{Max}-\Delta\alpha(t)=\alpha k\text{Max}-(Ck(t)/Cadj(k)(t-1))*FOVadj(k) \quad \text{(equation 3a)}$$

and, for a motion MVT in the sense in which X varies negatively, $$\alpha(t)=\alpha k\text{Min}+\Delta\alpha(t)=\alpha k\text{Min}+(Ck(t)/Cadj(k)(t-1))*FOVadj(k) \quad \text{(equation 3b)}.$$

The tracking point TP(t) at the instant t is situated in the plane (OX, OZ) and on the extremity EXT, at the measured distance Dk(t) from the origin point O, the coordinates [X(t), Y(t), Z(t)] of the tracking point TP(t) are therefore:

$$[X(t)=Dk(t)\cos(\alpha(t)); Y(t)=0; Z(t)=Dk(t)\sin(\alpha(t))] \quad \text{(equation 4)}.$$

The calculations of the various angles $\Delta\alpha(t)$, $\alpha(t)$ and the estimation of the position of the extremity EXT are carried out for a target object belonging to an arbitrary horizontal plane (ox, oy), corresponding to the plane in which the tracking point TP(t−1) was situated at the previous instant t−1. Stated otherwise, the arbitrary horizontal plane can be the plane defined by the equation: $Z=Dk(t-1)\sin(\alpha(t-1))$.

It is recalled that this mode of implementation relates to a monodirectional tracking of the target object, there will be described hereinafter an adaptation of the principle of this mode of implementation for a multidirectional tracking, notably by adapting the calculations of plane angular sectors to calculations of solid angles.

It is also recalled that a solid angle is the three-dimensional analogue of the plane angle. It firstly designates a portion of space delimited by a cone which is not necessarily circular. The vertex of the cone is the vertex of the solid angle. The solid angle is equal to the ratio of the area of a spherical cap intercepted by the cone to the squared radius of the sphere. A solid angle can be considered to be a measure of the size of an object which appears to an observer on the vertex. In the international system of units (SI), a solid angle is expressed in a dimensionless unit called a steradian (sr).

Figure 6:
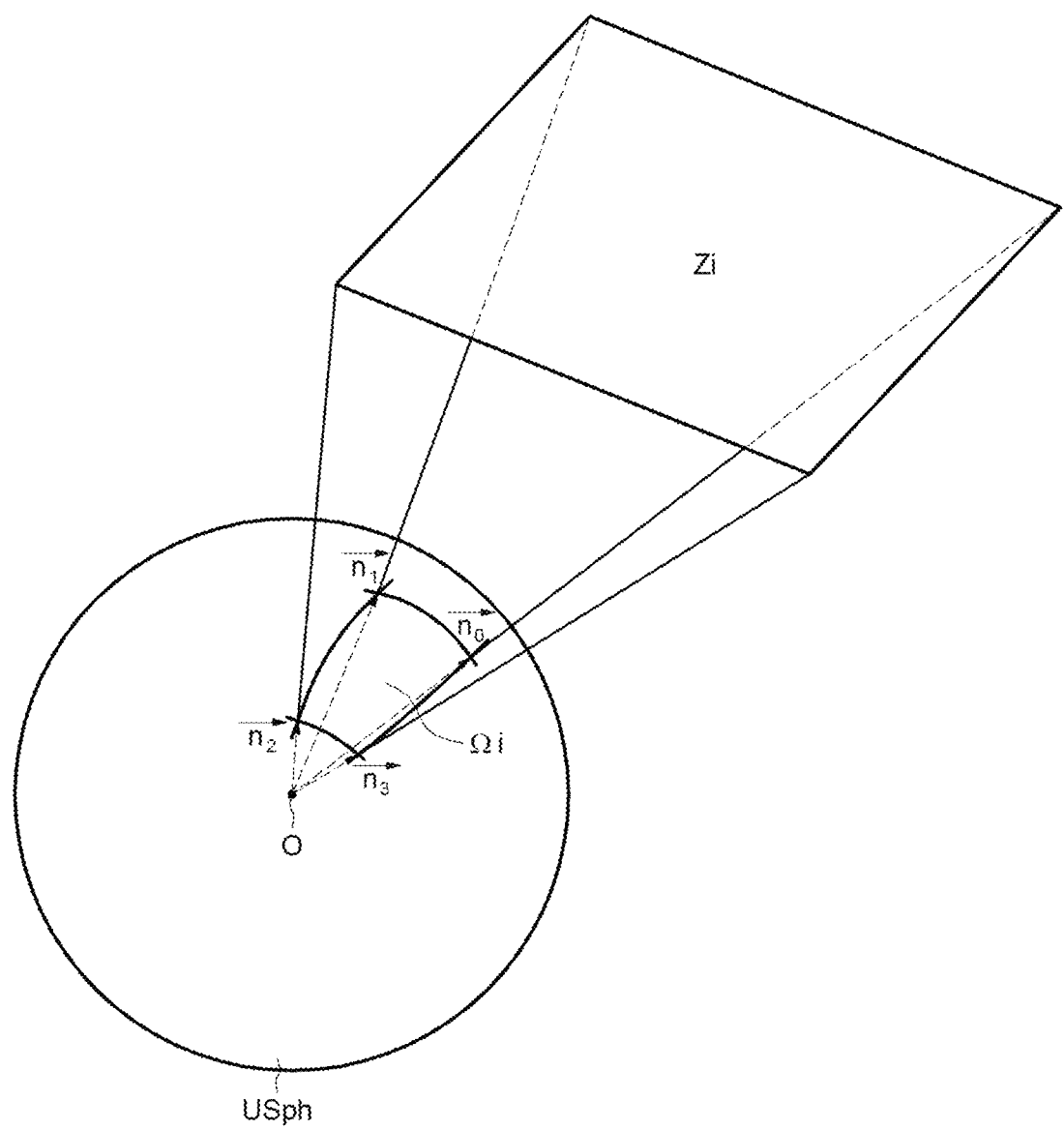

FIG. 6 represents the solid angle $\Omega i$ formed on the unit sphere USph by a detection zone Zi of a time of flight sensor of the type of that considered previously.

In the publication by Oleg Mazonka, "Solid Angle of Conical Surfaces, Polyhedral Cones, and Intersecting Spherical Caps" (2012) a formula making it possible to calculate the solid angle of a plane polygon in space, whose N vertices are tagged in space by the N unit vectors $\{\vec{n}_0, \vec{n}_1, \ldots, \vec{n}_{N-1}\}$, is given.

There is defined, with $\vec{n}_{-1}=\vec{n}_{N-1}$, $\vec{n}_N=\vec{n}_0$, for $0 \leq j \leq N-1$, $a_j = \vec{n}_{j-1} \cdot \vec{n}_{j+1}$; $b_j = \vec{n}_{j-1} \cdot \vec{n}_j$;

The solid angle $\Omega i$ of the polygon (here Zi) whose N vertices are tagged by the N unit vectors $\{\vec{n}_0, \vec{n}_{N-1}\}$ is given by:

$$\Omega_i = 2\pi - \sum_{j=0}^{N-1} \arctan\left(\frac{d_j}{b_j c_j - a_j}\right) \quad \text{(equation 5)}$$

Figure 7:
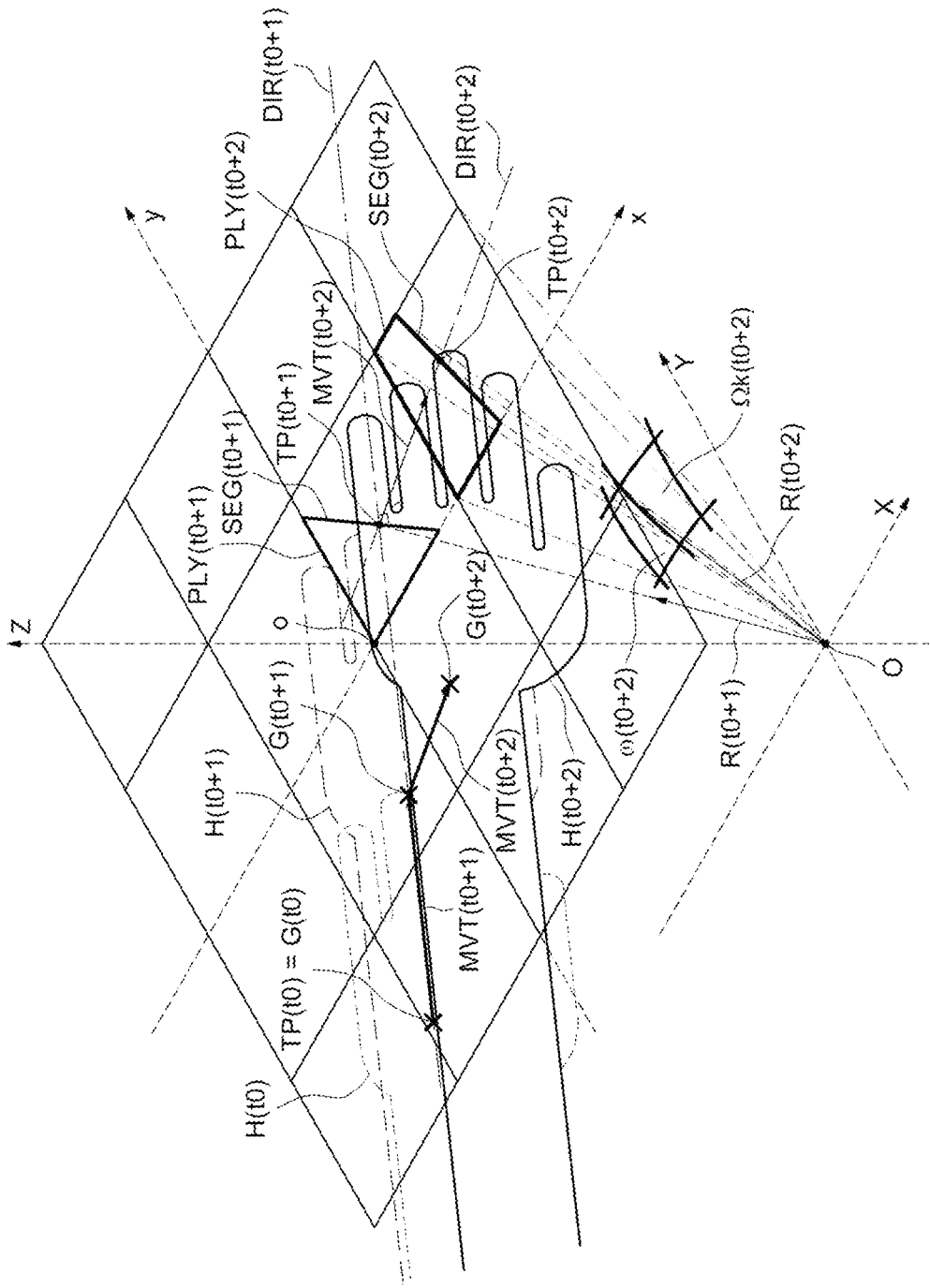

FIG. 7 represents an advantageous mode of implementation of multidirectional tracking of an edge of the target object, according to a principle analogous to the mode of implementation described previously in conjunction with FIGS. 4 and 5.

The field of view of the sensor is divided into contiguous detection zones in the two directions X and Y.

A first tracking point TP(t0) is calculated, for example situated at the barycentric position G(t0) of the target object H(t0) at an initial instant to.

A motion vector MVT(t0+1) is calculated as the difference of two successive barycentric positions G(t0), G(t0+1) and makes it possible to calculate the position of a tracking point TP(t0+1) in space.

The geometric constructions hereinafter allow the calculation of the tracking point TP(t0+2) at an instant t0+2, in accordance with the representation of FIG. 7, nonetheless the implementation of the obtaining of the tracking point TP(t0+1) at the instant t0+1 follows exactly the same principle.

A director line DIR(t0+2) is obtained on the basis of the earlier tracking point TP(t0+1) and of the direction of the motion vector MVT(t0+2).

The motion vector MVT(t0+2) is also obtained, in this example, as the difference of the successive barycentric positions G(t0+1), G(t0+2).

The last detection zone Zk(t0+2) is identified as being the last detection zone having a non-zero degree of coverage Ck(t0+2) at the instant t0+2, along the director line DIR(t0+2).

In the last detection zone Zk(t0+2), an extremity segment SEG(t0+2) perpendicular to the director line DIR(t0+2) is constructed and forms a polygon PLY(t0+2) with at least two edges of the last detection zone Zk(t0+2).

The said at least two edges are the edges situated on the side of the previous tracking point TP(t0+1), in the sense opposite to the sense of the motion vector MVT(t0+2), starting from the said segment SEG(t0+2).

Various segments are constructed by iterations, for example starting from the point of entry of the director line DIR(t0+2) into the last detection zone Zk(t0+2), until the ratio of the solid angle $\omega$(t0+2) of the polygon PLY(t0+2) to the total solid angle $\Omega$k(t0+2) of the last detection zone Zk(t0+2) is as close as possible to the value of the degree of coverage Ck(t0+2) obtained for the last detection zone Zk(t0+2).

The said solid angles $\omega$, $\Omega$ are centered on the origin point O; it is recalled that the origin point O is the origin of the spatial frame (OX, OY, OZ) in which the various geometric calculations are carried out and is also the optical center of the optical system with which the reception part RC of the time of flight sensor TOF is equipped.

The solid angles can be calculated by feeding into equation 5 defined hereinabove.

Moreover, the various geometric constructions, such as the motion vectors, the director lines, the extremity segments and the polygons, are effected in an arbitrary horizontal plane (ox, oy), for example the horizontal plane to which the previous tracking point belongs.

The tracking point TP(t0+2) is then obtained in this arbitrary horizontal plane, at the intersection of the segment SEG(t0+2) and of the director line DIR(t0+2), and its unit direction vector at the origin R(t0+2) is also calculated.

The distance Dk(t0+2) measured by time of flight in the last detection zone Zk(t0+2) is applied to the unit direction vector R(t0+2), so as to obtain the position in the space (OX, OY,OZ) of the tracking point TP(t0+2).

For example, the iterations making it possible to obtain the extremity segment SEG(t0+1) satisfying the ratio of solid angles can be implemented by testing various unit direction vectors at the origin R of the positions belonging to the director line DIR(t0+1) and situated inside the last detection zone Zk(t0+1).

To summarize, in this mode of implementation the said estimation of the position of the extremity EXT of the target object H includes a construction of an extremity segment SEG in the said last detection zone Zk, perpendicular to the direction DIR of the motion of the target object H. This construction is such that the ratio of the solid angle $\omega$ of the polygon PLY formed by the extremity segment SEG and at least two edges of the last detection zone Zk to the total solid angle $\Omega$ of the last detection zone Zk approaches as closely as possible the value of the calculated degree of coverage Ck in the last detection zone Zk.

Figure 8:
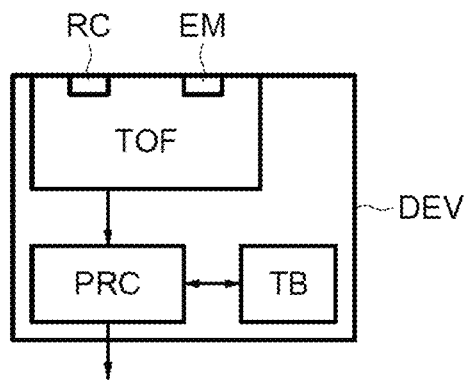

FIG. 8 represents a tracking points acquisition device DEV incorporating a time of flight sensor TOF including an emitter EM configured to emit a radiation directed towards the target object and a receiver RC. The radiation is preferably a laser radius, for example identifiable by the receiver such as an emission of the pulsed laser emission type.

The emitter EM and the receiver RC are typically each equipped with a respective optical system, the optical centre of the receiver defining an origin point O.

The receiver includes a network PDT of detection zones Zi and is configured to receive a radiation reflected by the target object in the respective fields of view FOV of each detection zone Zi.

A processor PRC is configured to implement at least one of the said modes of implementation described hereinabove in conjunction with FIGS. 3 to 7.

To summarize, the processor PRC is configured to determine distances Di separating the target object H from an origin point O by measuring the time of flight of the said radiation in each detection zone Zi.

The processor PRC is also configured to estimate, on the basis of the said distances Di and of the said degrees of coverage Ci, the position of a tracking point TP corresponding to a position of an extremity EXT of the target object H inside a detection zone Zk chosen in the direction DIR of the motion MVT of the target object H. For example the processor PRC can be a unit such as a microcontroller, linked to a memory TB.

Figure 9:
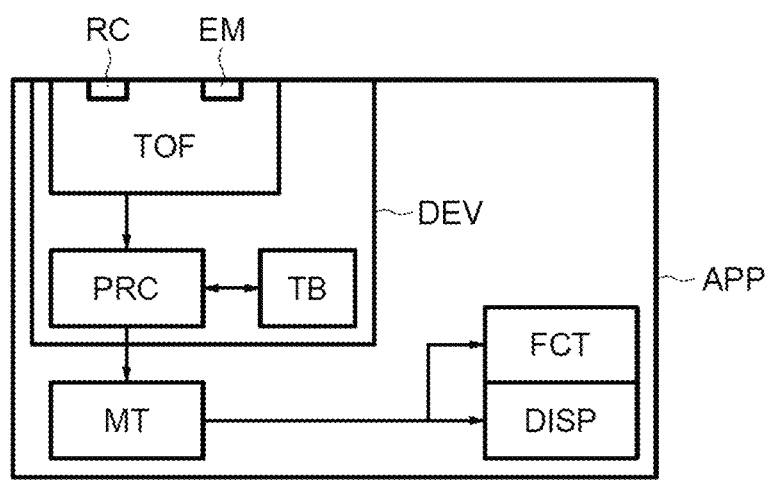

FIG. 9 represents an electronic apparatus APP, for example a portable telephone, a touch-tablet or else a dashboard of a vehicle, including a tracking points acquisition device DEV notably able to implement at least one of the modes of implementation described previously in conjunction with FIGS. 3 to 7.

Moreover the apparatus APP includes a processing means MT capable of translating the said tracking points of the trajectory into a function FCT, for example a user control such as a zoom control on a road map display, and/or for example a display DISP such as the display of a cursor on a screen, the cursor being able to reproduce on the screen the motion of the target object.

The processing means can also be a unit such as a microprocessor or a microcontroller.

There is proposed according to one aspect a method for acquiring tracking points belonging to a trajectory of a target object in motion including: an emission of a radiation, for example an electromagnetic radiation such as a laser radius, towards the target object, a reflection of the radiation on the target object and a reception of this radiation reflected by the target object, in respective fields of view of each detection zone of a network of detection zones; a processing including a determination of distances separating the target object from an origin point by measuring the time of flight of the said radiation in each detection zone; a calculation of a degree of coverage of each detection zone; and an estimation, on the basis of the said distances and of the said degrees of coverage, of the position of a tracking point corresponding to a position of an extremity of the target object inside a detection zone chosen in the direction of the motion of the target object.

The estimation of the position of an extremity of the target object inside a detection zone chosen in the direction of the motion of the target object makes it possible to utilize the entire dynamic range of the sensor, to not lose sensitivity on account of an affine transformation, and to maximize the precision by utilizing correlations of the degrees of coverage of detection zones.

The said chosen detection zone is advantageously the last detection zone which has a non-zero degree of coverage and is situated along the direction of the motion of the target object.

The degree of coverage is advantageously representative of the proportion of the field of view of a detection zone occupied by the target object, for example the degree of coverage corresponds to the ratio of the quantity of reflected radiation received in each detection zone to a maximum reference quantity, the maximum quantity corresponding to a radiation reflected by an object occupying the whole of the field of view of this detection zone, the said object being separated from the origin point by the distance measured in this zone.

According to one mode of implementation, the maximum reference quantity is prerecorded or determined on the basis of a model function.

According to one mode of implementation, the said processing includes a determination of a barycentric position of the target object and the said direction of the motion is determined by two successive barycentric positions.

The first tracking point can then be the first barycentric position of the target object.

Barycentric positions obtained via the degrees of coverage of each detection zone allow faithful acquisition of the direction of the motion, but less faithful as regards the position of the target object. In this mode of implementation, the barycentric positions are thus advantageously utilized only for the direction of the motion of the target object, the position being moreover faithfully acquired via the position of an extremity of the target object.

According to one mode of implementation, the said estimation of the position of the extremity of the target object includes a construction of an extremity segment in the said last detection zone, perpendicular to the direction of the motion of the target object, such that the value of the ratio of the solid angle of the polygon formed by the extremity segment and at least two edges of the last detection zone to the total solid angle of the last detection zone is equal to or as close as possible to the value of the degree of coverage calculated in the last detection zone, the said solid angles being centered on the origin point. A detection zone has for example a square shape.

This advantageous mode of implementation corresponds to a multidirectional tracking of an edge of the object.

According to one mode of implementation, the said estimation of the position of the extremity of the target object includes a construction of a plane angular sector in the field of view of the said last detection zone such that the value of the ratio of this angular sector to the total angle of the field of view of the last detection zone is equal to or as close as possible to a proportion of the measured degree of coverage.

The proportion can advantageously be representative of the proportion of surface area occupied by the target object in a neighboring detection zone.

This mode of implementation corresponds to a monodirectional tracking of an edge of the target object, thereby exhibiting the advantage of being simple in respect of quantity of calculation and applying without defect to a use in which the direction of the motion of the target object is unique.

According to another aspect there is proposed a device for acquiring tracking points belonging to a trajectory of a target object in motion, including: an emitter configured to emit a radiation, for example an electromagnetic radiation such as a laser radius, towards the target object and a receiver, including a network of detection zones, configured to receive this radiation reflected by the target object in the respective fields of view of each detection zone. The device further includes a processor configured to: determine distances separating the target object from an origin point by measuring the time of flight of the said radiation in each detection zone; calculate a degree of coverage of each detection zone; and estimate, on the basis of the said distances and of the said degrees of coverage, the position of a tracking point corresponding to a position of an extremity of the target object inside a detection zone chosen in the direction of the motion of the target object.

Advantageously, the processor is configured to choose the last detection zone which has a non-zero degree of coverage and is situated along the direction of the motion of the target object, for the said chosen detection zone.

According to one embodiment, the device includes a memory configured to store a maximum reference quantity or parameters of a model function making it possible to determine a maximum reference quantity, the maximum reference quantity corresponding to a radiation reflected by an object occupying the whole of the field of view of each detection zone as a function of the distance separating the said object from the origin point, and the processor is configured to calculate the degree of coverage equal to the ratio of the quantity of reflected radiation received in each detection zone to the said maximum reference quantity associated with the distance measured in this detection zone.

According to one embodiment, the processor is configured to determine a barycentric position of the target object and to determine the said direction of the motion by two successive barycentric positions.

The processor can then be configured to take as first tracking point the first barycentric position of the target object.

According to one embodiment, the processor is configured to estimate the position of the extremity of the target object by constructing an extremity segment in the said last detection zone, perpendicular to the direction of the motion of the target object, so that the value of the ratio of the solid angle of the polygon formed by the extremity segment and at least two edges of the last detection zone to the total solid angle of the last detection zone is equal to or as close as possible to the value of the degree of coverage calculated in the last detection zone, the said solid angles being centred on the origin point.

According to one embodiment, the processor is configured to estimate the position of the extremity of the target object by constructing a plane angular sector in the field of view of the said last detection zone so that the value of the ratio of this angular sector to the total angle of the field of view of the last detection zone is equal to or as close as possible to a proportion of the measured degree of coverage.

The said proportion is advantageously representative of the proportion of surface area occupied by the target object in a neighboring detection zone.

According to one embodiment, the device includes at least one time of flight sensor incorporating the said emitter and the said receiver.

There is also proposed an electronic apparatus, such as a portable telephone or an embedded computer on board a vehicle, including a device such as defined hereinabove.

The electronic apparatus can furthermore include a processing means capable of translating the said tracking points of the trajectory into a function such as a user control and/or into a display such as the display of a cursor on a screen.

What is claimed is:

1. A method for acquiring tracking points belonging to a trajectory of a target object in motion, the method comprising:
emitting a radiation towards the target object;
receiving a reflection of the radiation from the target object in respective fields of view of each detection zone of a network of detection zones;
processing the reflection by determining distances separating the target object from an origin point by measuring a time of flight of the radiation in each detection zone;
determining a degree of coverage of each detection zone; and
estimating, based on the distances and on the degree of coverage of each detection zone, a position of a tracking point corresponding to a position of an extremity of the target object inside a respective detection zone chosen in a direction of motion of the target object, wherein estimating the position of the extremity of the target object comprises constructing a plane angular sector in a field of view of a last detection zone such that a ratio of the plane angular sector to a total angle of the field of view of the last detection zone is equal to a proportion of the degree of coverage.

2. The method according to claim 1, wherein the detection zone chosen is a last detection zone which has a non-zero degree of coverage and is situated along the direction of the motion of the target object.

3. The method according to claim 1, wherein the degree of coverage corresponds to a ratio of a quantity of reflected radiation received in each detection zone to a maximum reference quantity corresponding to a radiation reflected by an object occupying a whole of a field of view of the respective detection zone, the object being separated from the origin point by the distance measured in the respective detection zone.

4. The method according to claim 3, wherein the maximum reference quantity is prerecorded or determined based on a model function.

5. The method according to claim 1, wherein processing the reflection further comprises determining a barycentric position of the target object and in which the direction of the motion is determined by two successive barycentric positions.

6. The method according to claim 5, wherein a first tracking point is a first barycentric position of the target object.

7. The method according to claim 1, wherein the proportion is representative of a proportion of surface area occupied by the target object in a neighboring detection zone.

8. A method, for acquiring tracking points belonging to a trajectory of a target object in motion, the method comprising:
emitting a radiation towards the target object;
receiving a reflection of the radiation from the target object in respective fields of view of each detection zone of a network of detection zones;
processing the reflection by determining distances separating the target object from an origin point by measuring a time of flight of the radiation in each detection zone;
determining a degree of coverage of each detection zone; and
estimating, based on the distances and on the degree of coverage of each detection zone, a position of a tracking point corresponding to a position of an extremity of the target object inside a respective detection zone chosen in a direction of motion of the target object, wherein estimating the position of the extremity of the target object comprises constructing an extremity segment in a last detection zone, perpendicular to the direction of the motion of the target object, such that a ratio of a solid angle of a polygon formed by the extremity segment and at least two edges of the last detection zone to a total solid angle of the last detection zone is equal to the degree of coverage calculated in the last detection zone, the solid angles being centered on the origin point.

9. The method according to claim 8, wherein the detection zone chosen is a last detection zone which has a non-zero degree of coverage and is situated along the direction of the motion of the target object.

10. The method according to claim 8, wherein the degree of coverage corresponds to a ratio of a quantity of reflected radiation received in each detection zone to a maximum reference quantity corresponding to a radiation reflected by an object occupying a whole of a field of view of the respective detection zone, the object being separated from the origin point by the distance measured in the respective detection zone.

11. The method according to claim 10, wherein the maximum reference quantity is prerecorded or determined based on a model function.

12. The method according to claim 8, wherein processing the reflection further comprises determining a barycentric position of the target object and in which the direction of the motion is determined by two successive barycentric positions.

13. A device for acquiring tracking points belonging to a trajectory of a target object in motion, the device comprising:
an emitter configured to emit a radiation towards the target object;
a receiver configured to receive a reflection of the radiation from the target object in respective fields of view of each detection zone of a network of detection zones; and
a processor configured to:
determine distances separating the target object from an origin point by measuring a time of flight of the radiation in each detection zone;
determine a degree of coverage of each detection zone; and
estimate, based on the distances and on the degree of coverage of each detection zone, a position of a tracking point corresponding to a position of an extremity of the target object inside a respective detection zone chosen in a direction of the motion of the target object, wherein the processor is further configured to estimate the position of the extremity of the target object by constructing a plane angular sector in a field of view of a last detection zone so that a ratio of this angular sector to a total angle of the field of view of the last detection zone is equal to a proportion of the degree of coverage.

14. The device according to claim 13, wherein the processor is configured to choose a last detection zone which has a non-zero degree of coverage and is situated along the direction of the motion of the target object as a chosen detection zone.

15. The device according to claim 13, further comprising a memory configured to store a maximum reference quantity or parameters of a model function, wherein the processor is further configured to determine a maximum reference quantity, the maximum reference quantity corresponding to a radiation reflected by an object occupying a whole of the field of view of each detection zone as a function of the distance separating the object from the origin point, wherein the processor is further configured to calculate the degree of coverage equal to a ratio of a quantity of reflected radiation received in each detection zone to the maximum reference quantity associated with the distance measured in the respective detection zone.

16. The device according to claim 13, wherein the processor is further configured to determine a barycentric position of the target object and to determine the direction of the motion by two successive barycentric positions.

17. The device according to claim 16, wherein the processor is configured to take, as a first tracking point, a first barycentric position of the target object.

18. The device according to claim 13, wherein the proportion is representative of a proportion of surface area occupied by the target object in a neighboring detection zone.

19. The device according to claim 13, further comprising at least one time of flight sensor incorporating the emitter and the receiver.

20. The device according to claim 13, wherein the processor is further configured to display the tracking points of the trajectory on a display element coupled to the device.

21. An electronic apparatus, comprising a device according to claim 13.

22. A device for acquiring tracking points belonging to a trajectory of a target object in motion, the device comprising:
an emitter configured to emit a radiation towards the target object;
a receiver configured to receive a reflection of the radiation from the target object in respective fields of view of each detection zone of a network of detection zones; and
a processor configured to:
determine distances separating the target object from an origin point by measuring a time of flight of the radiation in each detection zone;
determine a degree of coverage of each detection zone; and
estimate, based on the distances and on the degree of coverage of each detection zone, a position of a tracking point corresponding to a position of an extremity of the target object inside a respective detection zone chosen in a direction of the motion of the target object, wherein the processor is configured to estimate the position of the extremity of the target object by constructing an extremity segment in a last detection zone, perpendicular to the direction of the motion of the target object, so that a ratio of a solid angle of a polygon formed by the extremity segment and at least two edges of the last detection zone to a total solid angle of the last detection zone is equal to the degree of coverage calculated in the last detection zone, the solid angles being centered on the origin point.

23. The device according to claim 22, wherein the processor is configured to choose a last detection zone which has a non-zero degree of coverage and is situated along the direction of the motion of the target object as a chosen detection zone.

24. The device according to claim 22, further comprising a memory configured to store a maximum reference quantity or parameters of a model function, wherein the processor is further configured to determine a maximum reference quantity, the maximum reference quantity corresponding to a radiation reflected by an object occupying a whole of the field of view of each detection zone as a function of the distance separating the object from the origin point, wherein the processor is further configured to calculate the degree of coverage equal to a ratio of a quantity of reflected radiation received in each detection zone to the maximum reference quantity associated with the distance measured in the respective detection zone.

25. The device according to claim 22, wherein the processor is further configured to determine a barycentric position of the target object and to determine the direction of the motion by two successive barycentric positions.

* * * * *